United States Patent
Ichinose et al.

(10) Patent No.: US 7,064,967 B2
(45) Date of Patent: Jun. 20, 2006

(54) FUEL CELL SYSTEM AND CONTROL METHOD

(75) Inventors: Masaya Ichinose, Hitachiota (JP); Kenji Takeda, Hitachi (JP); Motoo Futami, Hitachiota (JP); Masahiro Komachiya, Hitachinaka (JP); Kenji Kubo, Hitachi (JP)

(73) Assignees: Hitachi, Ltd., Tokyo (JP); Hitachi Home & Life Solutions Inc., Tokyo (JP)

( * ) Notice: Subject to any disclaimer, the term of this patent is extended or adjusted under 35 U.S.C. 154(b) by 278 days.

(21) Appl. No.: 10/786,090

(22) Filed: Feb. 26, 2004

(65) Prior Publication Data

US 2004/0170038 A1    Sep. 2, 2004

(30) Foreign Application Priority Data

Feb. 28, 2003   (JP)   .............................. 2003-053459

(51) Int. Cl.
*H02M 7/122*   (2006.01)
(52) U.S. Cl. ...................... 363/56.01; 363/97
(58) Field of Classification Search ................ 363/16, 363/55, 56.01, 56.03, 56.04, 95, 97; 320/101; 327/536; 429/22, 23
See application file for complete search history.

(56) References Cited

U.S. PATENT DOCUMENTS

| | | | |
|---|---|---|---|
| 6,404,655 B1 * | 6/2002 | Welches | 363/41 |
| 2004/0115487 A1 * | 6/2004 | Ichinose et al. | 429/9 |
| 2005/0048337 A1 * | 3/2005 | Matsubayashi et al. | 429/23 |
| 2005/0052221 A1 * | 3/2005 | Kohnotoh et al. | 327/536 |

FOREIGN PATENT DOCUMENTS

JP     2000-21429     1/2000

* cited by examiner

*Primary Examiner*—Adolf Berhane
(74) *Attorney, Agent, or Firm*—Antonelli, Terry, Stout and Kraus, LLP.

(57) ABSTRACT

A battery voltage Ef of a fuel cell 1 is detected, and a current instruction value which transformed an electric power instruction value Pfc of the fuel cell is reduced at falling-down of the voltage Ef. A current limiter 8 makes the current instruction value a limit value at the time of the falling-down of Ef, and reduces the limit value according to the fall of Ef. For example, current instruction value is restricted so as to begin to reduce battery current IFC at voltage drop alarm level (first threshold value), and become zero at voltage drop protection level (second threshold value).

10 Claims, 5 Drawing Sheets

FUEL CELL SYSTEM AND CONTROL METHOD

BACKGROUND OF THE INVENTION

The present invention relates to an operation control apparatus for a fuel cell suitable to prevent it from deteriorating and method for controlling thereof.

When the fuel cell characteristic is changed by deterioration or load is changed rapidly, the DC output of the fuel cell reduces below a set value transitionally, even if reaction gas is supplied and the fuel cell itself is normal.

Japanese Laid-open Patent Publication 2000-21429 discloses that a load setting value is reduced in accordance with reduction of the fuel cell voltage to protect it by operation of a reverse converter, when the voltage of the fuel cell falls down.

SUMMARY OF THE INVENTION

In the above conventional reference, the load setting value is reduced according to the amount of voltage reduction of the fuel cell. For this reason, if the load setting value is fallen down by load change, the current outputted from the fuel cell will also be changed. Moreover, since the load setting value is only reduced in accordance with the amount of voltage reduction, there is a possibility of deteriorating the fuel cell when the fuel cell has taken load just before the protection stop level thereof.

An object of the present invention is to provide an operation control apparatus for the fuel cell suitable to fall-down of the fuel cell current without influence of load change, when the voltage of the fuel cell falls.

Another object of the present invention is to provide a control apparatus of the fuel cell which controls the output of the fuel cell to about zero near the voltage-drop protection stop level of the fuel cell.

According to one aspect of the present invention, the invention provides an operation control method for a fuel cell, wherein the fuel cell is connected to an AC power system through a power converter and electric power is supplied to a load from connection portion between the AC power system and the power converter, and the power instruction value is applied to the power converter in accordance with the load power, the method comprising steps of:
detecting the voltage of the fuel cell;
reducing the limit value of the power instruction in response to the drop of the fuel cell voltage; and
setting the power instruction value as the limit value when the voltage of the fuel cell reduces to a first threshold value.

According to another aspect of the invention, the output current of the fuel cell begin to reduce when the fuel cell current reduce to the first threshold value and the electric power instruction value is reduced to zero when the fuel cell voltage reduce to the second threshold value.

According to another aspect of the invention, an operation control apparatus comprising:
a fuel cell;
a power converter connected between said fuel cell and the AC power system;
a load receiving the electric power from connection portion between said fuel cell and the AC power system;
a power instruction means for outputting the power instruction value of the fuel cell to the power converter in accordance with the load power, and
a limiter for detecting the fuel cell voltage and reducing the limit value of the power instruction value in accordance with the fuel cell voltage drop and the power instruction value being set as the limit value when the fuel cell voltage falls down to the first threshold value.

The limiter detects the output current of the fuel cell and the difference between the output current and the power instruction value. Additionally, the limiter regulates the duty instruction value so as to reduce the difference to zero and set the duty instruction value as a gate pulse of the power converter by comparing the duty instruction value with a triangle wave.

DETAILED EXPLANATION OF THE PREFERRED EMBODIMENTS

Figure 1:
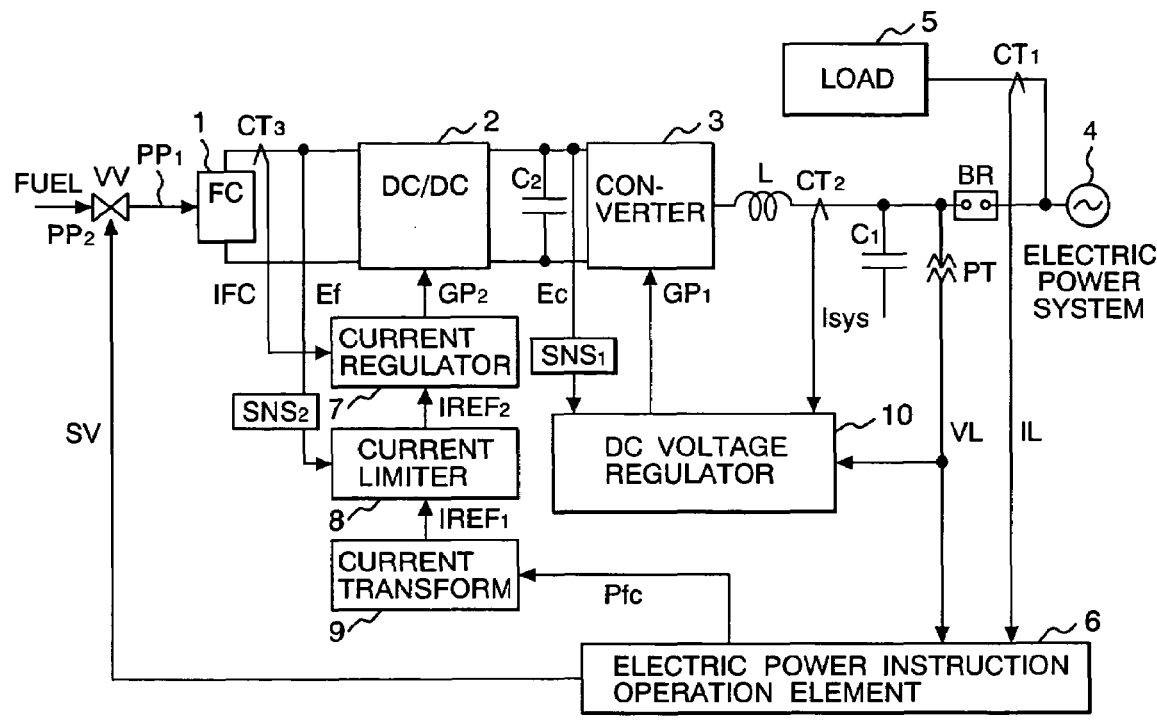
FIG. 1 is a block diagram showing the fuel cell operation control apparatus according to an embodiment 1 of this invention.

An embodiment of the present invention is hereafter explained using from FIG. 1 to 7. FIG. 1 is a block diagram showing the system configuration of the operation control apparatus of a fuel cell according to an embodiment of the present invention. FIG. 1 is a circuit diagram of a voltage type electric power converter with function to transform the DC electric power to the single phase AC electric power or single phase AC electric power into DC electric power.

In FIG. 1, the fuel cell (FC) 1 is connected to the DC/DC converter 2 which changes DC voltage into DC voltage in FIG. 1. The DC/DC converter 2 is connected to a DC side capacitor C2 of the converter (inverter) 3 which transforms DC electric power into AC power, and the AC output terminal of the converter 3 is connected to a reactor L which constitutes the AC filter for removing high-harmonics. The reactor L is connected to the capacitor C1 constituting the AC filter and a circuit breaker BR. The circuit breaker BR is connected to the electric power system 4. A load 5, such as, home electric appliances, an electric lights, and machine tools, are connected between the circuit breaker BR and the electric power system 4.

The fuel cell 1 is connected to a piping PP1, and the piping PP1 is connected to a valve VV for fuel adjustment. The valve VV for fuel adjustment regulates the amount of the fuel which flows into the piping PP1 through a piping PP2. The fuel cell 1, for example, reforms commercial gas and converts it to hydrogen rich fuel. The DC voltage is generated by the chemical reaction of the hydrogen rich gas and air. The generated DC voltage is supplied to the DC/DC converter 2.

The detection value IL of a current detector CT1 installed in the input side of load 5 and the detection value VL of the voltage detection means PT for detecting the voltage of the electric power system 41 are inputted into an electric power instruction operation element 6. The electric power instruction operation element 6 outputs the opening degree signal SV of the valve VV for fuel adjustment to the valve VV and calculates power instruction value Pfc determining power to be outputted by the DC/DC converter 2.

The electric power instruction value Pfc is inputted into a current converter 9 and multiplies by the gain transforming electric power into current, and outputs the fuel cell output current setting value IREF1 to the current limiter 8. The current limiter 8 inputs the fuel cell output current setting value IREF1 and the fuel cell voltage Ef detected with a voltage detector SNS2, and outputs the fuel cell current output instruction value IREF2 to a current regulator 7.

The current regulator 7 controls the gate pulse GP2 for driving the DC/DC converter 2 so that the fuel cell current detection value IFC detected with a current detector CT3 coincide with the battery current output instruction value IREF2.

The converter 3 controls the voltage Ec of the DC side of the converter 3 by a DC voltage controller 10. A current detector CT2 detects the current Isys which flows the reactor L, the voltage detector SNS1 detects the voltage Ec of the capacitor C2 installed in the direct-current side of the converter 3, and the voltage Ec is inputted into the DC voltage controller 10 with the detected voltage value VL.

The DC voltage controller 10 outputs the gate signal GP1 for driving the converter 3.

Figure 2:
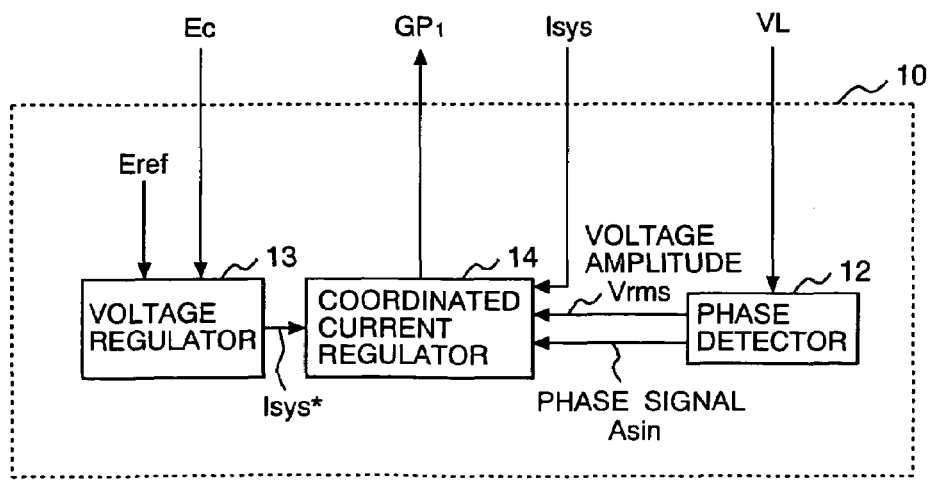
FIG. 2 is a block diagram showing a DC voltage controller.

FIG. 2 shows a DC voltage controller 10. The DC voltage controller 10 comprises a voltage regulator 13, a phase detector 12, and a coordinated current regulator 14. The voltage regulator 13 comprises, for example, a proportional and integral control element, and calculates a current instruction value Isys* which controls the output of the converter 3 so as to coincide the DC voltage instruction value Eref with the detected DC voltage Ec, and outputs the current instruction value Isys* to the coordinated current regulator 14. The phase detector 12 calculates the phase signal Asin of amplitude "1" following the phase of the voltage detection value VL, and the amplitude value Vrms of system voltage, and outputs it to the coordinated current regulator 14.

The current instruction value Isys*, the phase signal Asin and the amplitude value Vrms are inputted into the coordinated current regulator 14 together with the current Isys detected by the current detector CT2.

Figure 3:
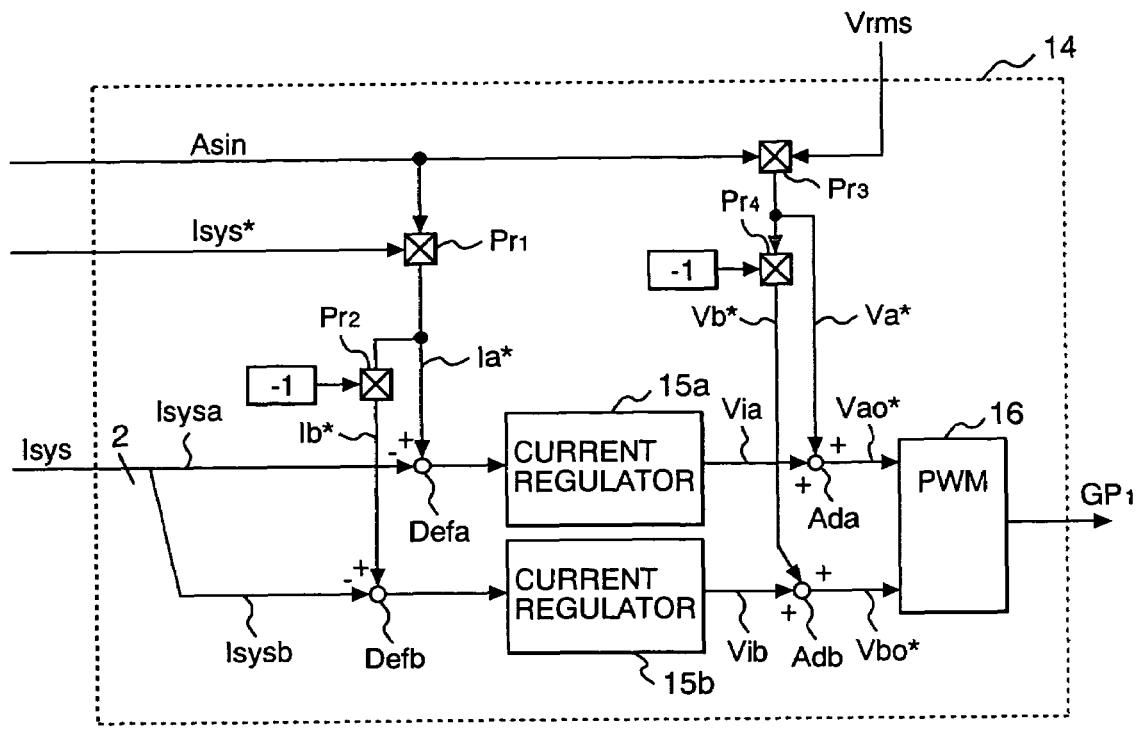
FIG. 3 is a block diagram showing a coordinated current regulator.

FIG. 3 shows the detail of the coordinated current regulator. In the coordinated current regulator 14, current instruction Isys* and the phase signal Asin are inputted into a multiplier Pr1 and the multiplier Pr1 multiplies these input values and outputs a current instruction value Ia* having the amplitude Isys* and the sine wave form. As the phase signal Asin is adjusted to the sine wave form following a-phase of system voltage, the current instruction Ia* becomes the current instruction value at power factor 1 of the a-phase.

The current instruction Ia* is inputted into the subtracter defa and a multiplier Pr2, and the multiplier Pr2 multiplies the input value Ia* by "−1", and outputs a current instruction value Ib* of b-phase. The subtracter defa inputs the current instruction value Ia* and a a-phase current Isysa of a current detection value, and calculates difference dIa, and outputs it to a current regulator 15a. Similarly, the subtracter defb inputs a current instruction value Ib* and a b-phase current Isysb of the current detection value, and calculates difference dIb, and outputs it to a current regulator 15b.

The voltage amplitude value Vrms is an average value of the voltage VL of the electric power system 4 to which the converter 3 is connected, and it is supplied to a multiplier Pr3 as an instruction value. The multiplier Pr3 multiplies the voltage amplitude detection value Vrms and the phase signal Asin and outputs a voltage feed-forward instruction value Va* having amplitude Vrms and the sine wave form If the phase signal Asin is adjusted to the sine wave which follows a-phase of system voltage, the voltage feed-forward instruction Va* coincides mostly with the voltage instruction value of a-phase.

The voltage feed-forward instruction Va* is inputted into a multiplier Pr4 and the adder Ada, and a multiplier Pr4 multiplies the input value Va* by "−1", and outputs a voltage feed-forward instruction value Vb* of b-phase to an adder Adb.

The current regulator 15a and 15b adjust each output value Via and Vib so that the inputted differences may be made zero. Each output value of the current regulator 15a and 15b is inputted into an adder Ada and Adb, respectively, and an adder Ada outputs Vao*, as a result of adding voltage feed-forward instruction value Va* and the output value Via to the PWM operation element 16. The adder Adb outputs Vbo* as a result of adding voltage feed-forward instruction value Vb* and the output value Vib to the PWM operation element 16,.

The PWM operation element 16 outputs the gate pulse GP1 for operating a single phase inverter to the gate circuit of the converter after comparing inputted Vao* and Vbo* with a triangular wave.

Figure 4:
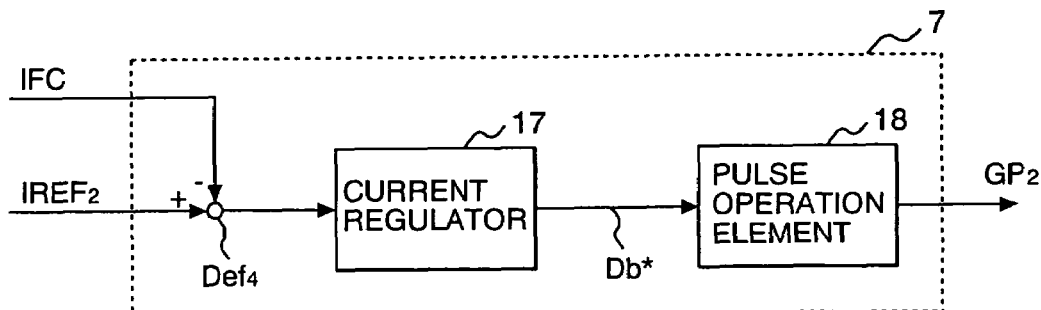
FIG. 4 is a block diagram showing a current regulator which drives a DC/DC converter.

FIG. 4 shows the current regulator which drives the DC/DC converter 2. The current regulator 7 inputs the current instructions IREF2 and the current detection value IFC into the subtracter def4, and the subtracter def4 calculates the difference between the current instruction value IREF2 and the current detection value IFC, and outputs it to the current regulator 17. The current regulator 17 adjusts each output duty instruction value Db* so as to make the inputted difference zero and outputs output value Db* to a pulse operation element 18.

The current regulator 17 is a PI regulator, and the output value Db* appears as change of the level. The pulse operation element 18 outputs the gate pulse GP2 for operating the DC/DC converter 2 after comparing the inputted value Db* with a triangular wave to the gate circuit of the DC/DC converter 2.

Figure 5:
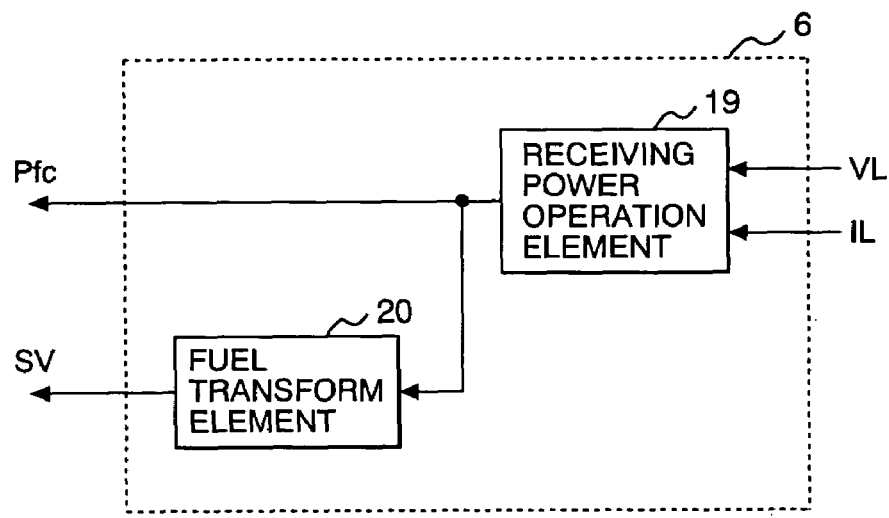
FIG. 5 is a block diagram showing an electric power instruction operation element.

FIG. 5 shows the electric power instruction operation element 4. The electric power instruction operation element 4 inputs the voltage detection value VL and the current detection value IL, and calculate load power using an electric power operation element 19, and calculates the electric power instruction value Pfc following the load power. Moreover, it multiplies the electric power instruction value Pfc by the predetermined gain with the current converter 20, and output the control signal SV which operates the valve VV for fuel regulation.

Figure 6:
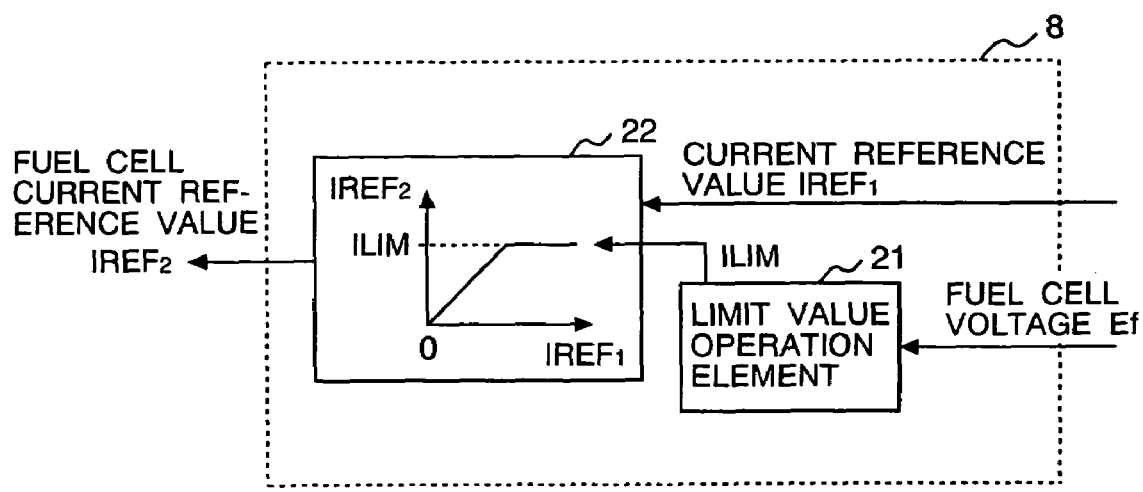
FIG. 6 is a block diagram showing a current limiter according to the embodiment 1 of the present invention.
Figure 7:
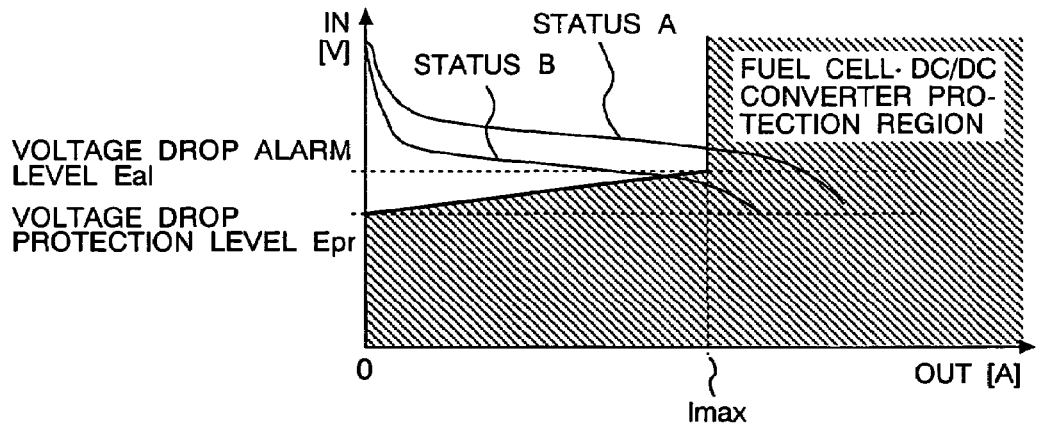
FIG. 7 is a diagram showing operation of the current limiter according to the embodiment 1 of the present invention 1.

FIG. 6 is a block diagram showing the current limiter 8, and FIG. 7 is a diagram explaining the operation of the current limiter 8. The current limiter 8 comprises a limit value operation element 21 which inputs the battery voltage Ef and outputs the limit value ILIM, and a limiter 22 which inputs the current instruction value IREF1 and the limit value ILIM, and outputs the battery current instruction value IREF2.

When the fuel cell voltage Ef usually maintained at the predetermined value falls down, the limit value operation element 21 reduces the current limit value ILIM as a function ILIM of Ef (Ef) according to (1) formula, and outputs the current limit value ILIM (Ef) to the limiter 22.

$$ILIM(Ef) = \{Imax/(Eal-Epr)\} \times Ef - Imax \times Epr/(Eal-Epr) \quad (1)$$

Where Eal: voltage drop alarm level, Epr: voltage drop protection level, Imax: rated output current of the DC/DC converter 2.

The operation is explained referring to FIG. 7. In the normal state when the fuel cell voltage detection value Ef is higher than the voltage drop alarm level Eal, the current limit value ILIM is set as the rated output current value Imax of the DC/DC converter 2. At this time, ILIM>=IREF1 is satisfied and a current instruction value is expressed as a relation of formula (2).

$$IREF2 = IREF1 \quad (2)$$

For example, the current instruction value IREF2 follows the instruction value Pfc of the electric power instruction operation device 6 and take a value between the limit values ILIM (ILIM=Imax in this case) and zero. At this time, the fuel which suited the current instruction value IREF2 is supplied to the fuel cell, and the I–V characteristic of the fuel cell at this time is State A.

For example, when abnormalities occurs in the fuel cell system during operation of the state A, the I–V characteristic of the fuel cell moves to State B, and the fuel cell voltage detected value Ef falls below the voltage drop alarm level Eal. In this case, the current limit value ILIM falls down according to formula (1). At this time, the current limiter 8 inputs a fuel cell voltage Ef and the current instruction value IREF1 and calculates the current limit value ILIM, and outputs IREF2 according to formula (3).

$$\text{Where } IREF1 > ILIM, IREF2 = ILIM \quad (3)$$

Thereby, the output current IFC of the fuel cell 1 begins to fall down. When the voltage Efc of the fuel cell falls down to the voltage drop protection level Epr (Efc=Epr), the current instruction value IREF2 become 0, and the output current IFC of the fuel cell 1 also becomes zero.

The voltage drop protection level Epr is decided considering the fuel cell life (deterioration). Moreover, it may consider as a target value from the operation actual result of the number day of the past, and the setting method of minus several % of the target value etc. may be used. The voltage alarm level Eal should just set up an alarm level like plus several % of the protection level.

According to the present embodiment, as the fuel sell voltage is detected and the current instruction value of DC/DC converter for controlling the fuel cell is restricted, the fuel cell current can always be controlled as a limit value, without being influenced by change of the output electric power instruction value of the fuel cell. When abnormalities of the fuel cell voltage down occurs, for example, fuel shortage, the current of the fuel cell is restricted and deterioration of the fuel cell may be prevented.

The current instruction value is restricted and decreased as the restriction method of a current instruction value, so as to make the fuel cell current of the voltage drop protection stop level zero. For this reason, even if operation continues just before reaching the voltage drop protection stop level, the fuel cell current is set to about 0 and it can prevent deterioration of the fuel cell.

Figure 8:
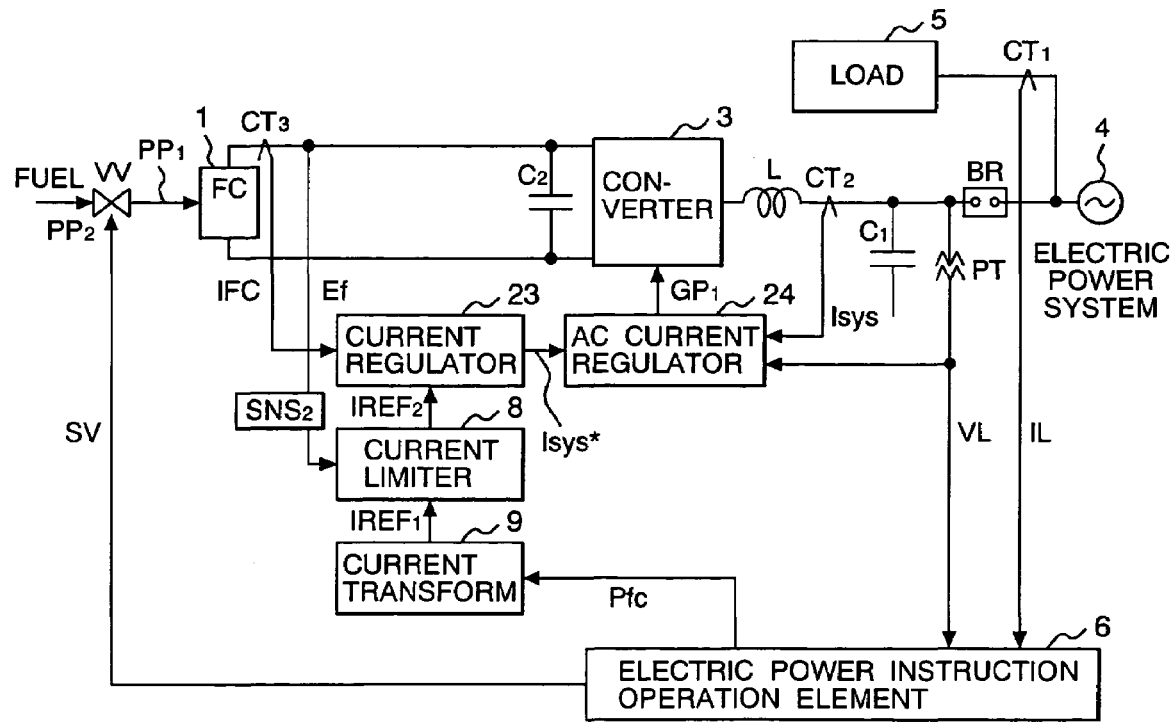
FIG. 8 is a block diagram showing the fuel cell operation control apparatus according to an embodiment 2 of the present invention.

Next, other embodiment of the operation of the invention will be explained. FIG. 8 is a block diagram showing the system configuration of the operation control apparatus of the fuel cell by an embodiment 2. The diagram shows a voltage type power converter with the function to transform the AC electric power of single-phase AC electric power or single phase AC into DC electric power. The same reference signs as FIG. 1 show the same parts of the FIG. 1 and explanation is omitted.

FIG. 8 differs from the first embodiment in that the fuel cell(FC) 1 is connected to the DC side of the capacitor C2 of the converter 3 which transforms DC electric power into AC electric power. The detection value IL of the current detector CT1 installed in the input of load 5, and the detection value VL of a voltage detection means PT to detect the voltage of the electric power system 4 are inputted into the electric power instruction operation element 6. The electric power instruction operation element 6 outputs the opening signal SV of the valve VV for the fuel regulation supplies to the valve VV and calculates the electric power instruction value Pfc.

The electric power instruction value Pfc is inputted into the current converter 9 and multiplied by the gain transforming the electric power into the current, and outputs the output current setting value IREF1 of the fuel cell to the current limiter 8. The output current setting value of the fuel cell IREF1 and the fuel cell voltage Ef detected by the voltage detector SNS2 are inputted into the current limiter 8, and the current output instruction value of the fuel cell IREF2 is supplied to a current regulator.

Figure 10:
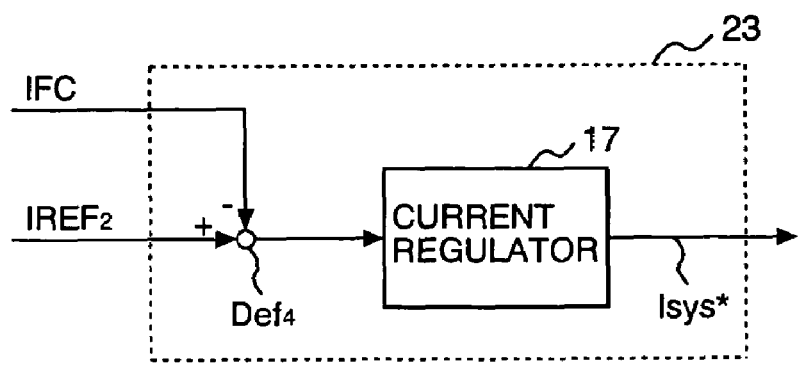
FIG. 10 is a block diagram showing an current regulator according to the embodiment 2 of the present invention.

FIG. 10 shows the current regulator 23. The current regulator 23 inputs the current instructions IREF2 and the current detection value IFC into the subtracter def4, and the subtracter def4 calculates the difference between the current instruction value IREF2 and the current detection value IFC, and outputs it to the current regulator 17. The current regulator 17 adjusts the output current instruction value Isys* of the converter and outputs the output value Isys* to the AC current controller 24 so that the inputted difference may be made zero. The current regulator 17 is a PI regulator.

Figure 9:
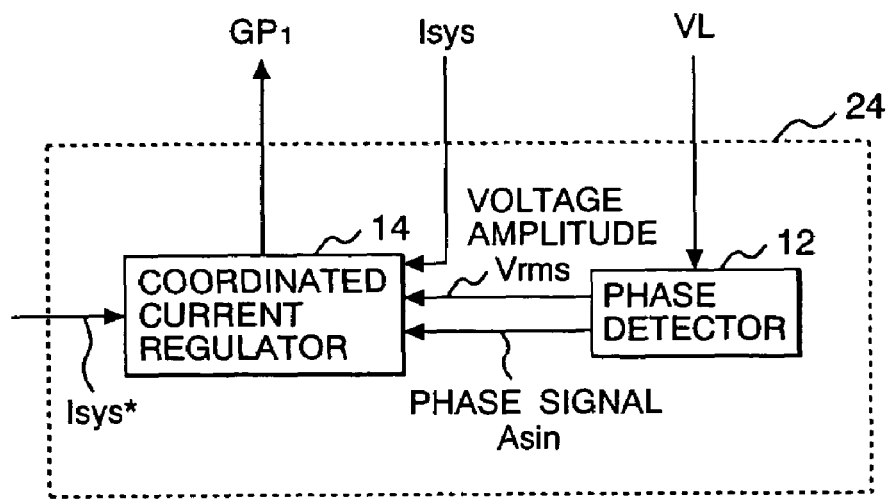
FIG. 9 is a block diagram showing the AC current regulator according to the embodiment 2 of the present invention.

FIG. 9 shows the AC current controller 24. The current regulator 23 shown in FIG. 10 is used in place of the voltage regulator 13 of the DC voltage controller 6 shown in FIG. 2. The AC current controller 24 inputs converter output current instruction value Isys*, and outputs the gate signal GP1 to control the converter 3 so as to coincide the output current Isys of the converter 3 with the converter output current instruction value Isys*.

According to the second embodiment, as the DC/DC converter becomes unnecessary in addition to the effect of first embodiment of the system can be carried out efficiently.

What is claimed is:

1. An operation control method for a fuel cell, wherein the fuel cell is connected to an AC power system through a power converter and electric power is supplied to a load from a connection portion between the AC power system and the power converter, and the power instruction value is applied to the power converter in accordance with the load power, the method comprising steps of:

detecting the voltage of the fuel cell; and reducing the limit value of the power instruction in response to the drop of the fuel cell voltage; and setting the power instruction value as the limit value when the voltage of the fuel cell reduces to a first threshold value.

2. An operation control method for a fuel cell according to claim 1, wherein the output current of fuel cell begins to fall down when the fuel cell voltage falls down to the first threshold value, and the electric power instruction value is reduced to zero when the fuel cell voltage falls down to the second threshold value.

3. An operation control method for a fuel cell according to claim 2, wherein the first threshold value is a voltage drop alarm level and the second threshold value is a voltage drop protection level which suspends the electric power converter.

4. An operation control method for a fuel cell according to claim 1, further comprising detecting the output current of the fuel cell, obtaining the difference between the electric power instruction value and the output current, adjusting a duty instruction value so that the difference may be set to 0, and making the duty instruction value the gate pulse of the electric power converter after comparing with a triangular wave.

5. An operation control apparatus comprising:
a fuel cell;
a power converter connected between said fuel cell and the AC power system;
a load receiving the electric power from connection portion between said fuel cell and the AC power system;
a power instruction means for outputting the power instruction value of the fuel cell to the power converter in accordance with the load power, and
a limiter for detecting the fuel cell voltage and reducing the limit value of the power instruction value in accordance with the fuel cell voltage drop and the power instruction value being set as the limit value when the fuel cell voltage falls down to the first threshold value.

6. An operation control apparatus for a fuel cell according to claim 5, wherein the power instruction value is reduced to zero when the fuel cell voltage falls down to the second threshold value.

7. An operation control apparatus for a fuel cell according to claim 6, wherein there is a relationship of the following formula (1) between the limit value and the fuel cell voltage.

$$ILIM(Ef) = I\mathrm{max}/(Eal-Epr) \times Ef - I\mathrm{max} \times Epr/(Eal-Epr) \quad (1)$$

Where ILIM: limit value, Ef: fuel cell voltage, and Eal: first threshold value and Epr: second threshold value, and Imax: rating output current of the electric power converter.

8. An operation control apparatus for a fuel cell comprising:
a fuel cell;
a power converter connected between said fuel cell and an AC power system, the power converter including a first converter for controlling DC output voltage of the fuel cell and a second power converter for connecting the first converter with the AC power system;
a load receiving the electric power from connection portion between said fuel cell and the AC power system,
a power instruction control means to supply the power instruction value of the fuel cell with the power converter in accordance with the load power; and
a limiter for detecting the fuel cell voltage and reducing the limit value of the power instruction value in accordance with the drop of the fuel cell voltage and setting the power instruction value as the limit value when outputting the power instruction value from the power instruction control means to the first converter.

9. An operating control apparatus according to claim 8, the limit means reduces the power instruction value to zero when the fuel cell voltage falls down to the second threshold value.

10. An operation control apparatus for an fuel cell according to claim 8, wherein the first converter comprises a DC/DC converter, and the second converter comprises an inverter, and the inverter detects AC voltage and AC current and is controlled by the operation controller which generates the gate signal for driving the inverter.

* * * * *